United States Patent
Huang

(10) Patent No.: US 9,286,106 B1
(45) Date of Patent: Mar. 15, 2016

(54) SCHEDULING PERIODIC TASKS WITH DEPENDENCIES AND DETERMINING IMPROPER LOOP DEPENDENCIES BETWEEN TASKS PLACED IN A WAITING TASKS SET AND IN A UNFINISHED DEPENDENT TASKS SET

(71) Applicant: CA, Inc., Islandia, NY (US)

(72) Inventor: Ai Huang, Beijing (CN)

(73) Assignee: CA, Inc., Islandia, NY (US)

( * ) Notice: Subject to any disclaimer, the term of this patent is extended or adjusted under 35 U.S.C. 154(b) by 322 days.

(21) Appl. No.: 13/863,913

(22) Filed: Apr. 16, 2013

(51) Int. Cl.
*G06F 9/46* (2006.01)
*G06F 9/54* (2006.01)
*G06F 9/48* (2006.01)
*G06F 9/50* (2006.01)

(52) U.S. Cl.
CPC ............... *G06F 9/46* (2013.01); *G06F 9/4881* (2013.01); *G06F 9/5038* (2013.01); *G06F 9/546* (2013.01)

(58) Field of Classification Search
None
See application file for complete search history.

(56) References Cited

U.S. PATENT DOCUMENTS

| | | | | |
|---|---|---|---|---|
| 6,941,360 B1 * | 9/2005 | Srivastava et al. | ............ | 709/223 |
| 2005/0038836 A1 * | 2/2005 | Wang | ............ | 707/204 |
| 2007/0021998 A1 * | 1/2007 | Laithwaite et al. | ............ | 705/9 |
| 2007/0050771 A1 * | 3/2007 | Howland et al. | ............ | 718/102 |
| 2008/0282246 A1 * | 11/2008 | Dolev | ............ | G06F 9/4881 718/102 |
| 2009/0070772 A1 * | 3/2009 | Shikano | ............ | 718/106 |
| 2010/0333109 A1 * | 12/2010 | Milnor | ............ | 718/106 |
| 2011/0119680 A1 * | 5/2011 | Li et al. | ............ | 718/106 |
| 2012/0047513 A1 * | 2/2012 | Lee et al. | ............ | 718/104 |
| 2012/0079490 A1 * | 3/2012 | Bond et al. | ............ | 718/103 |
| 2013/0198760 A1 * | 8/2013 | Cuadra et al. | ............ | 718/106 |
| 2013/0326537 A1 * | 12/2013 | Edelstein et al. | ............ | 718/106 |
| 2014/0237476 A1 * | 8/2014 | Steffen | ............ | G06F 9/505 718/103 |

* cited by examiner

*Primary Examiner* — Abdullah Al Kawsar
(74) *Attorney, Agent, or Firm* — Gillam IP PLLC

(57) ABSTRACT

A next task in a queue of tasks is considered for execution. In response to the next task having no dependent tasks, executing the next task. In response to the next task having dependent tasks, wherein the dependent tasks have been executed, executing the next task. In response to the next task having dependent tasks that have not completed execution, placing the next task into the set of waiting tasks. In response to placing the next task into the set of waiting tasks, determining if each dependent task of the next task is in the set of unfinished dependent tasks, placing each dependent task of the next task that is not in the set of unfinished dependent tasks into the set of unfinished dependent tasks, and establishing a link between the next task and each of its dependent tasks in the set of unfinished dependent tasks.

19 Claims, 7 Drawing Sheets

SCHEDULING PERIODIC TASKS WITH
DEPENDENCIES AND DETERMINING
IMPROPER LOOP DEPENDENCIES
BETWEEN TASKS PLACED IN A WAITING
TASKS SET AND IN A UNFINISHED
DEPENDENT TASKS SET

TECHNICAL FIELD

The current disclosure relates to a system and method for scheduling tasks, and in an embodiment, but not by way of limitation, a system and method for scheduling tasks in a computer system.

BACKGROUND

In some business computer systems, users often create calculation tasks and set a dependency relationship among the calculation tasks. For example, a particular task can only be run when the execution of all of its dependent tasks are completed. Additionally, users normally set different tasks to different calculation policies. For example, one cycle task is run every day, while another cycle task is run every week, while yet another cycle task is run on a monthly basis, and so on and so forth.

Such business computer systems can experience problems. For example, the business system often returns error messages during the execution of these calculation tasks. A reason for the errors is that a task cannot be executed because its dependent tasks have not yet been executed. Such business systems currently do not consider dependency relationships among the plurality of tasks. Moreover, when all of the tasks are loaded into a task scheduler, initiation of some of the tasks occurs even though their dependent tasks are not done executing. This results in an error, and further results in perhaps additional attempts (maybe resulting in additional errors) to run the failed tasks at a later time. Simply put, the root cause of the problem is that the business system doesn't know when all dependent tasks of the failed tasks are done. The current solution to this problem is simply to continuously run the failed tasks.

An additional problem arises when there are improper loop dependencies in the business system. FIG. 1 illustrates a simple improper loop dependency, wherein task A (110) is dependent on input from task B (120), task B (120) is dependent on input from task C (130), and task C (130) is dependent on input from task A (110). While the improper loop dependency in FIG. 1 is quite apparent upon simple inspection, in complex business systems, such loop dependencies can be much more complex (e.g., if there are over a thousand calculation tasks) and much more difficult to identify.

SUMMARY

Embodiments of the present disclosure include computer systems, computer processes, and computer processes embodied on computer readable media.

For example, such a system can be configured to maintain a queue of tasks. The tasks are ordered in the queue according to scheduled execution time. The system is further configured to maintain a set of waiting tasks, and maintain a set of unfinished dependent tasks. The system considers for execution a next task in the queue of tasks. In response to the next task having no dependent tasks, the system executes the next task. In response to the next task having one or more dependent tasks, if all of the one or more dependent tasks have been executed, the system executes the next task. In response to the next task having one or more dependent tasks that have not completed execution, the system places the next task into the set of waiting tasks. In response to the system placing the next task into the set of waiting tasks, for each dependent task of the next task, the system determines if each dependent task of the next task is in the set of unfinished dependent tasks, the system places each dependent task of the next task that is not in the set of unfinished dependent tasks into the set of unfinished dependent tasks, and the system establishes a link between the next task and each of its dependent tasks in the set of unfinished dependent tasks.

DETAILED DESCRIPTION

Figure 1:
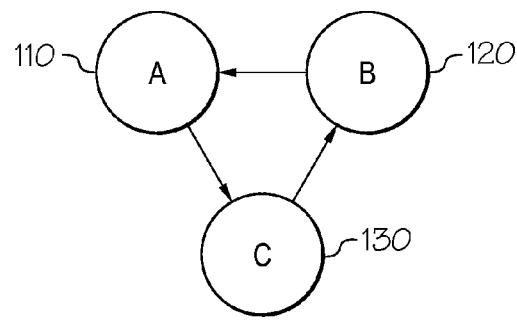
FIG. 1 illustrates an improper dependency loop.

In the following detailed description, reference is made to the accompanying drawings that show, by way of illustration, specific embodiments that may be practiced. These embodiments are described in sufficient detail to enable those skilled in the art to practice these embodiments. It is to be understood that the various embodiments, although different, are not necessarily mutually exclusive. For example, a particular feature, structure, or characteristic described herein in connection with one embodiment may be implemented within other embodiments without departing from the scope of the present disclosure. In addition, it is to be understood that the location or arrangement of individual elements within each disclosed embodiment may be modified without departing from the scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

In an embodiment of a system and method for scheduling tasks, the time of the commencement of one task should be equal to or greater than the maximum finish time of all its dependent tasks. Additionally, the next calculation time of one task is the expected time of execution of that task. That task will be run when all its dependent tasks are done.

In an embodiment, the following definitions and classes can be defined and used.

```
Class Task {
//Basic Information
    Unsigned Long    _id; //Task unique identification
    TaskType         _type; //Task Type
    Time             _lastCalculated; // last calculated time
    Time             _nextCalculation; //next calculation time
    TaskStatus       _status;
//Cycle Tasks
//After one task is done and _lastCalculated is updated, if it is a cycle task,
the Time Scheduler will calculate its _nextCalculation. _ nextCalculation =
_lastCalculated + _interval; and then insert it into the Task Queue
    Time             _interval;
//Failed Tasks
// If one task returns fail and _tryTimes is less than _maxTryTimes, the task
will be run again after _errorInterval. (_nextCalculation = current time +
_errorInterval.)
// _tryTimes is always equal to or less than _maxTryTimes;
// If one task returns fail and _tryTimes is equal to _maxTryTimes, the Task
Scheduler halts execution of the task and returns an error
//After a task is done, the Task Scheduler will set _tryTimes of the task to 0
    Time             _errorInterval;
    Unsigned Long    _tryTimes;
    Unsigned Long    _maxTryTimes;
//Dependent Tasks
//If one task includes some dependent tasks, and all of the dependent tasks
have been run, then after _dependentCalculationBar the one task can be run,
otherwise, the one task is still waiting on one or more dependent tasks
    Time             _dependentCalculationBar;
    Task*            _dependentTask[ ]; //all dependent task objects.
    Unsigned Long         _dependentTaskCount; //dependent task count.
    . . .
};
```

Figure 2A:
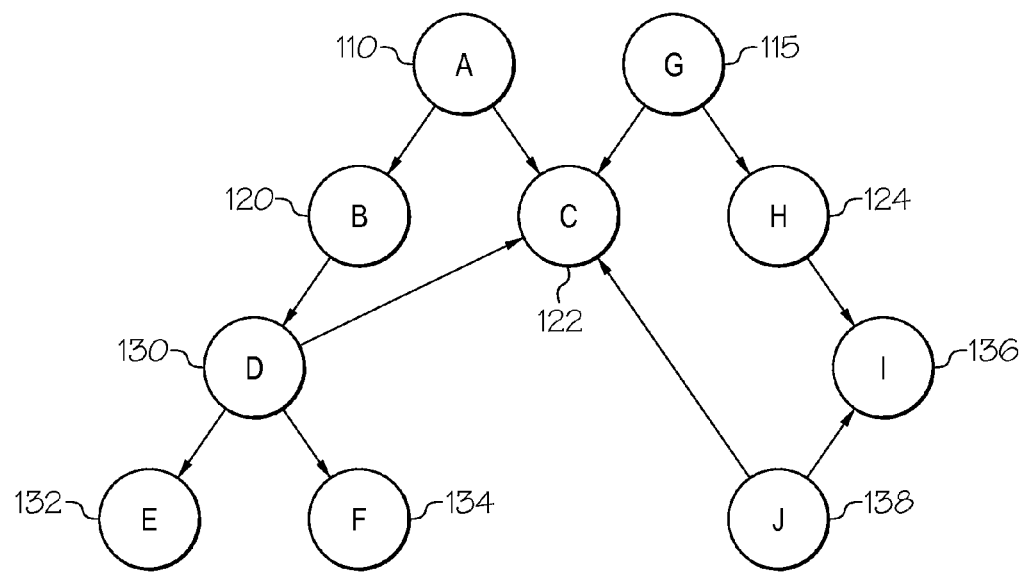
FIG. 2A illustrates a network of tasks and their dependencies.
Figure 2B:
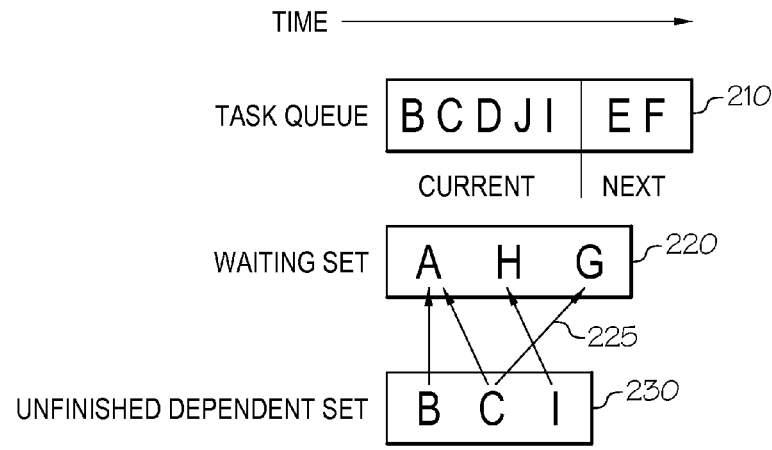
FIG. 2B illustrates a task queue, a waiting set, and an unfinished dependent set.

FIG. 2A illustrates a network of tasks 110, 115, 120, 122, 124, 130, 132, 134, 136, and 138 and their dependencies. While not as complex as a network of hundreds of tasks, FIG. 2A illustrates how even the addition of a few tasks compared to that of FIG. 1 increases the complexity and resulting difficulty in identifying improper loop dependencies. FIG. 2B illustrates a task queue 210, a waiting set 220, and an unfinished dependent set 230. FIG. 2B also illustrates the dependencies of this current example state. Specifically, task A is dependent on input and/or the completion of both tasks B and C, task H is dependent on task I, and task G is dependent on task C.

In the task queue 210, all tasks are sorted by their _nextCalculation time. So in the task queue 210, task B has an earlier execution time than task C, which has an earlier execution time than task D, and so on and so forth. The task queue 210 always pops up the task whose _nextCalculation time is the minimum or earliest _nextCalculation time.

The waiting set 220 can have a definition as follows—Typedef std::Map<Long, Task*>WaitingSet; //<Waiting Task ID, Waiting Task>. If the task scheduler pops up a task, but one or several its dependent tasks have not completed their execution, the task scheduler will not mark or send the task to a processor for execution. Rather, the task scheduler places the task into the waiting set 220.

The unfinished dependent set 230 can have a definition and class as follows.

```
Class ParentNode {
Task*  _parent[ ]; //Parent pointers (waiting task pointers) of
unfinished task.
Long   _count; //Count of parent objects (waiting tasks).
};
    Typedef std::map<Long, ParentNode*> UnfinishedDependentSet;
//<Unfinished Task ID, parents of unfinished task>. If a task is inserted into the
waiting set 220, the task scheduler 420 will check to determine whether all
unfinished dependent tasks for this task are in the unfinished dependent set 230.
If not all of the unfinished dependent tasks for this task are in the unfinished
dependent set 230, the task scheduler 420 will place them into the unfinished
dependent set 230. The task scheduler 420 then builds links 225 between the
waiting tasks in the waiting set 220 and every one of the unfinished dependent
tasks for the waiting tasks in the unfinished dependent set 230.
```

Figure 3:
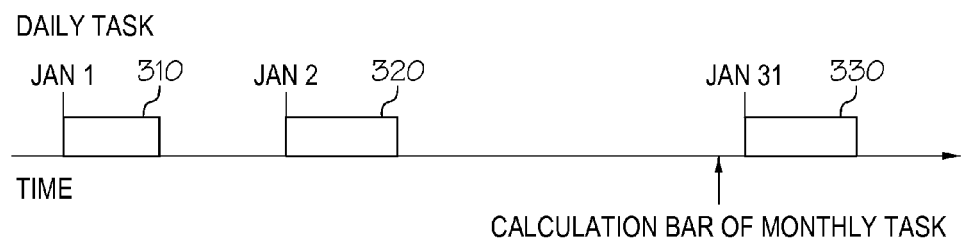
FIG. 3 illustrates a dependent calculation bar.

FIG. 3 illustrates a dependent calculation bar. In FIG. 3, there are two types of cycle tasks, daily tasks 310 and 320 and monthly task 330. The daily tasks 310, 320 are the dependent tasks of the monthly tasks, that is, the monthly task cannot execute until the completion of the daily tasks 310, 320. The dependent calculation bar ensures that the monthly task 330 will not be run until the last daily task on the last day of the month is run.

Figure 4:
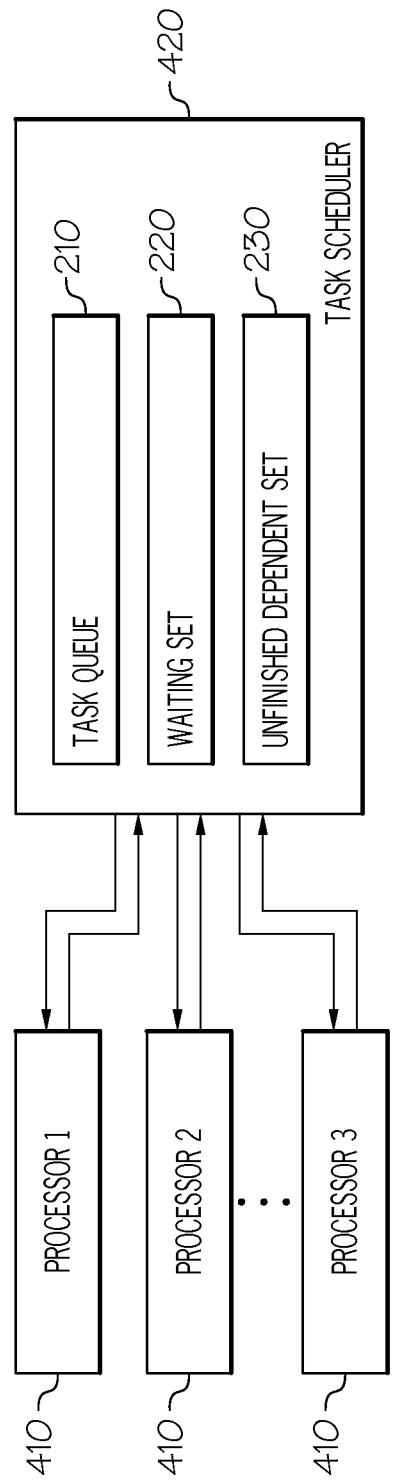
FIG. 4 illustrates a block diagram of a work flow in a scheduler system.
Figure 5:
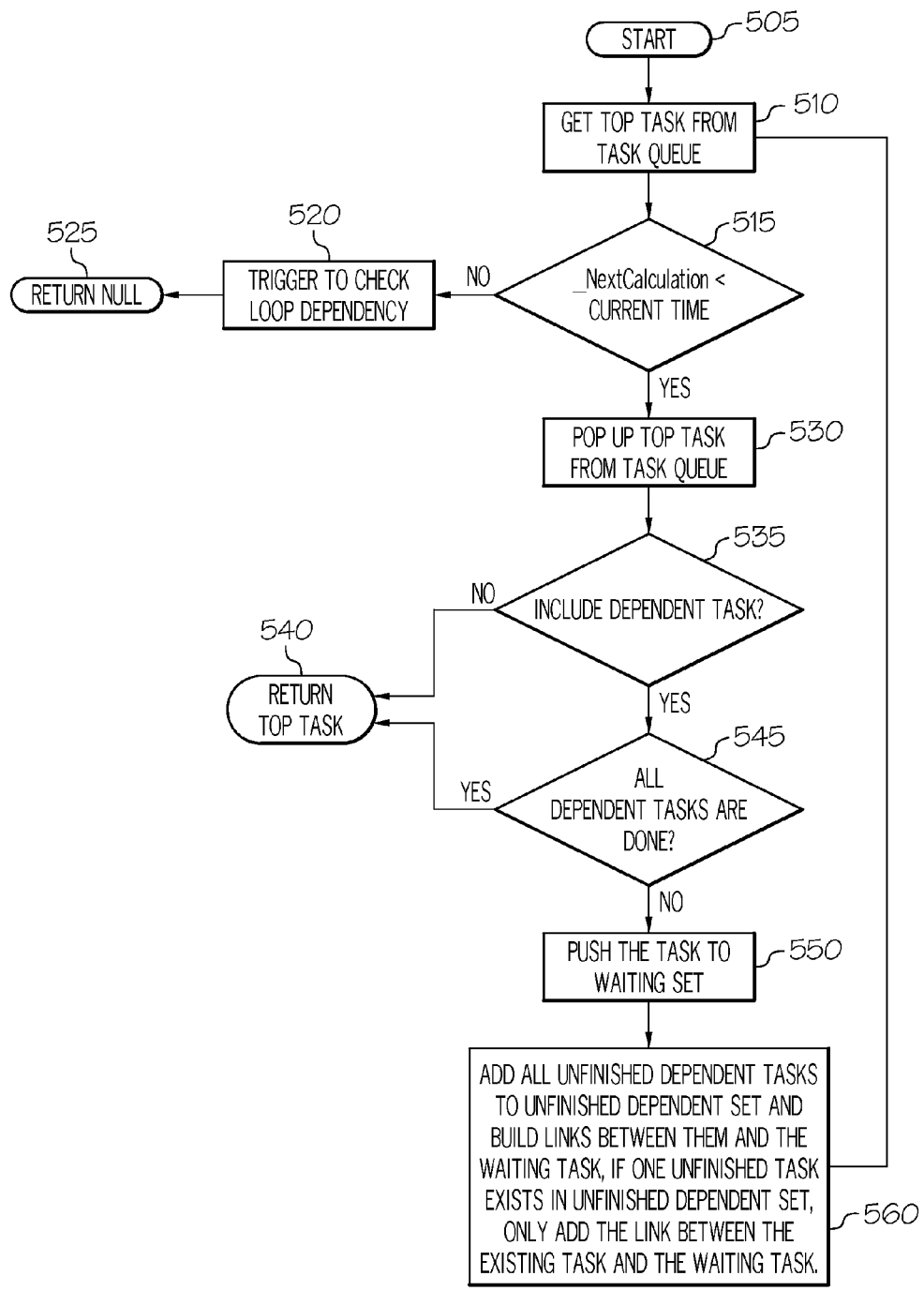
FIG. 5 is a flow chart illustrating a process of executing a task.

FIG. 4 illustrates a block diagram of a work flow in the scheduler system. The system has multiple processors 410. If one of the processors 410 is idle, it will try to get a task from the task scheduler 420 and run the task (FIG. 5 illustrates how to get a task from the task queue 210). If a task is inserted into the waiting set 220, the system can remind a user via a warning message to adjust the calculation policy of the waiting task. The message can report to the user the maximum next calculation time of the unfinished dependent tasks for the task at hand.

FIG. 5 is a flow chart illustrating a process of executing a task. The process commences at 505. At 510, the task scheduler 420 retrieves the top task from the task queue 210, that is, the task with the next execution time. At 515, the task scheduler 420 checks to determine if the _nextCalculation is less than or equal to the current time. If it is not, then the trigger for loop dependency is checked at 520. As discussed herein, a trigger for the check of loop dependency is a determination that a task is in the waiting queue 220 for greater than a particular amount of time.

More specifically, to check for an improper loop dependency, the task scheduler 420 checks for an old waiting task. If the task scheduler 420 does not find an old waiting task in the waiting set 220, then it will not check for an improper loop dependency. An old waiting task is a task that has been in the waiting set 220 for more than a particular amount of time, for example 24 hours. When the task scheduler 420 determines that there is an old waiting task (i.e., the first task in the task queue 210 is an old waiting task), it then identifies an improper loop dependency by determining that all tasks in a loop are in the waiting set 220 and are also in the in the unfinished dependent set 230. If the task scheduler determines that there is at least one improper loop dependency among the tasks, then all of the tasks of the loop cannot return to the task queue 210. After the task scheduler 420 finds an improper loop dependency in a cycle, an output error is generated that includes all the tasks in the loop, and these tasks are removed from the waiting set 220 and the unfinished dependent set 230. In making this determination, the task scheduler 420 uses the pointers that all tasks have to their children, such that a parent node includes all pointers to all of its unfinished tasks. The process of checking for an improper loop dependency at 525 is an efficient process because the task scheduler 420 only searches for loop dependencies in the waiting set 220, and in an embodiment, only the first task in the waiting set can be an old waiting task. After checking for an improper loop dependency, the task scheduler 420 returns a null at 525.

If however, at 515, the _nextCalculation is less than or equal to the current time, then the task is popped up from the task queue at 530. At 535, a check is made to determine if this task has any dependent tasks associated with it. If not, then this top task is returned for processing at 540. If this top task does have one or more dependent tasks associated with it, than at 545, a check is made to determine if all the dependent tasks have completed their execution. If all of the dependent tasks for this top task have completed their execution, then the top task is returned for processing at 540. If however, not all of the dependent tasks for this top task have completed their execution, then at 550, the top task is pushed onto the waiting set 220. When a task is put into the waiting set, it is removed from the task queue. After all the dependent tasks of this task are done, the task is removed from the waiting set and put back into the task queue. Then, at 560, all of the unfinished dependent tasks for this top task are added to the unfinished dependent set 230. Links 225 are built between the top task in the waiting set 220 and its unfinished dependent tasks 230.

Figure 6:
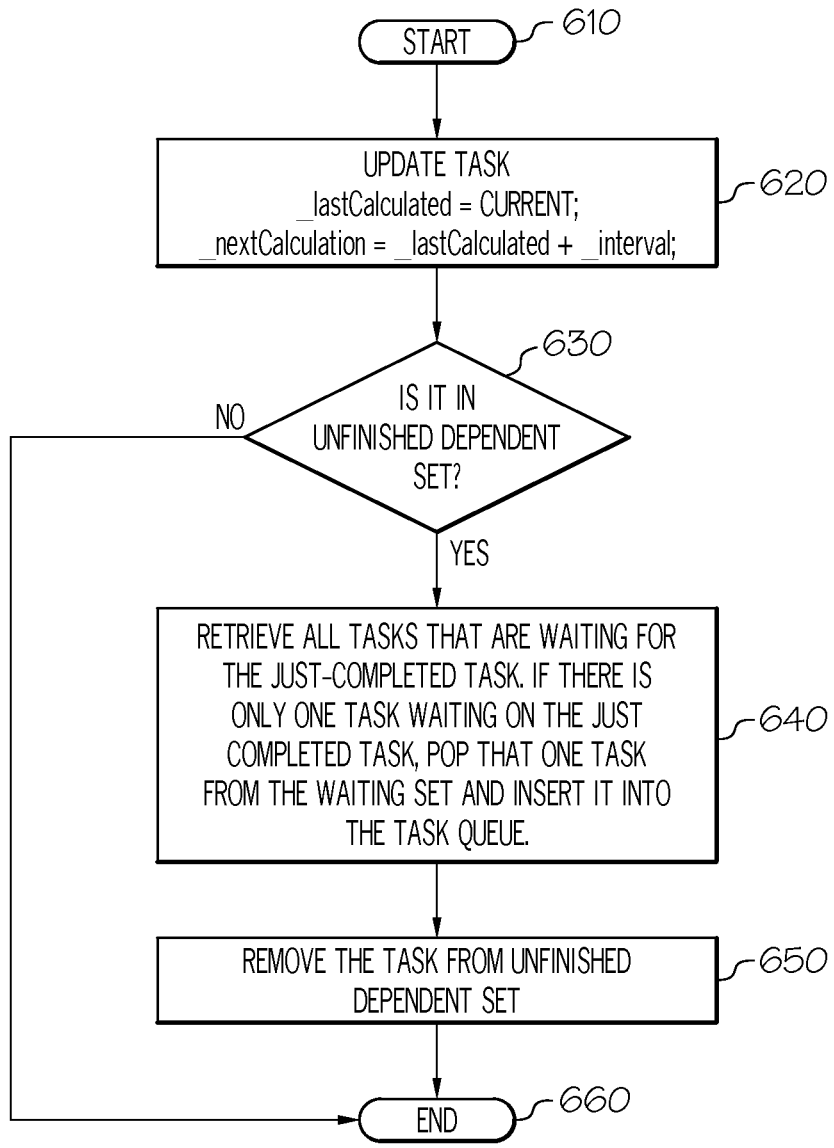
FIG. 6 is a flow chart illustrating a process of determining the implications of the completion of a task in the unfinished dependent task set.

FIG. 6 is a flow chart illustrating a process of determining the implications of the completion of a task in the unfinished dependent task set 230. The process commences at 610 and proceeds to 620. At 620, after the completion of a task, the task is updated by calculating the next time that the task will be scheduled to run (_nextCalculation). At 630, the task scheduler 420 will check to determine whether the task is in the unfinished dependent set 230. If the completed task is not in the unfinished dependent set 230, the process ends at 660. If the completed task is in the unfinished dependent set 230, then at 640, the task scheduler 420 retrieves all the tasks that are waiting for this just completed task. If there was only one task waiting on the just completed task, that one task is popped up from the waiting set 220 and inserted into the task queue 210. At 650, the just completed task is removed from the unfinished dependent set 230, and the process ends at 660.

Figure 7:
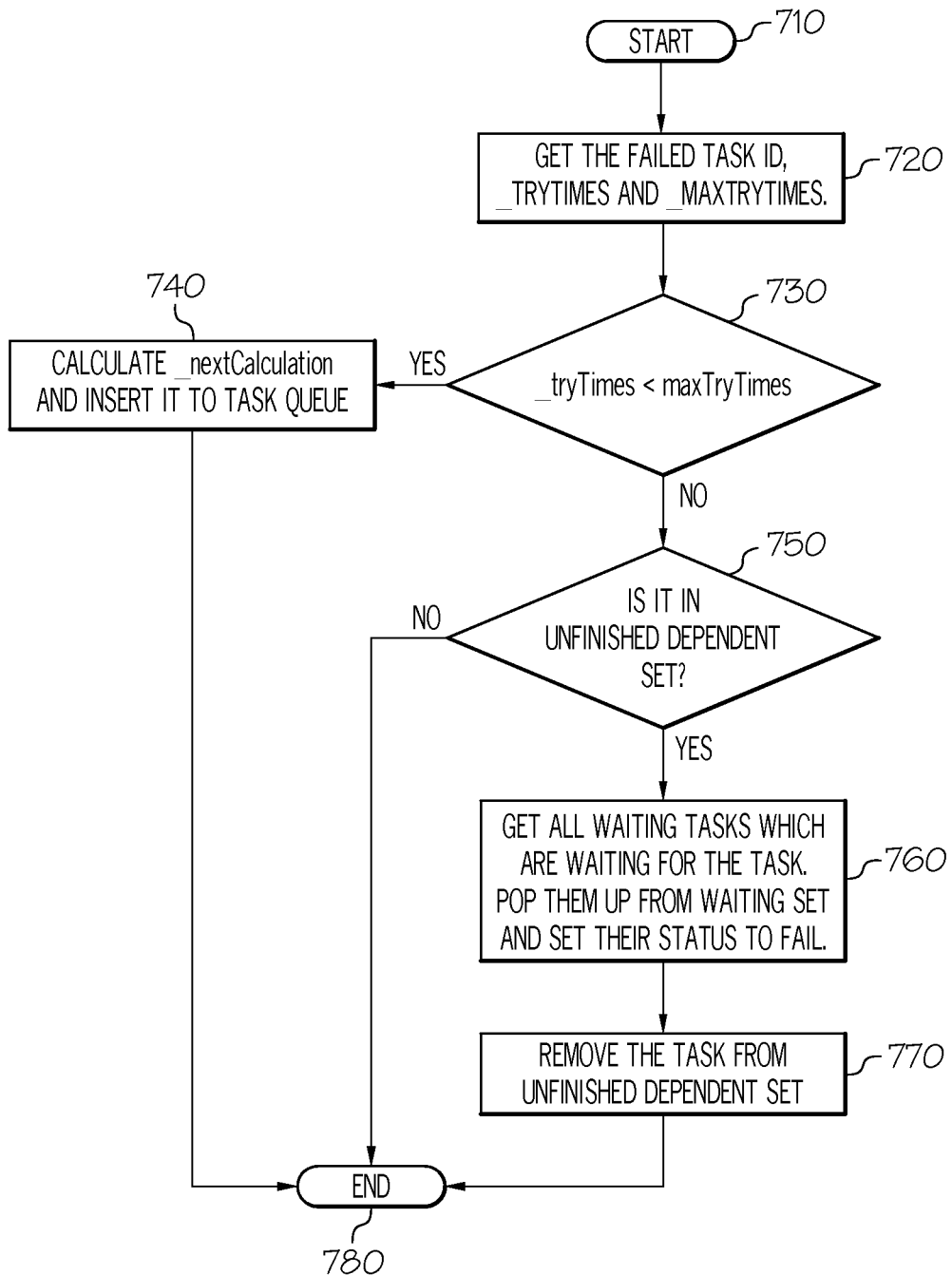
FIG. 7 is a flow chart illustrating a process to handle the failure of a task to successfully complete.

FIG. 7 is a flow chart illustrating a process to handle the failure of a task to successfully complete. The process commences at 710. At 720, the task scheduler 420 retrieves the task ID of the failed task and the values for _tryTimes and _maxTryTimes. The task scheduler 420 then checks to see if an attempt can be made to run the failed task again by checking to see if _tryTimes is less than _maxTryTimes at 730. If _tryTimes is less than _maxTryTimes), than at 740, the task scheduler 420 calculates a new _nextCalculation, inserts the just failed task into the task queue 210, and the process ends at 780. If _tryTimes is not less than _maxTryTimes at 730, then the task scheduler 420 at 740 checks to see if the failed task is in the unfinished dependent set 230. If the failed task is not in the unfinished dependent set 230, the process ends at 780. If the failed task that cannot be run again is in the unfinished dependent set 230, then the task scheduler, at 760, retrieves all tasks that are waiting for this failed task from the waiting queue 220, sets the status of these retrieved tasks to fail, and removes these retrieved tasks from the waiting set 220. At 770, the task scheduler removes the just failed task from the unfinished dependent set 230.

An embodiment provides a user interface so that a user can browse the task queue 210, the waiting set 220, and the unfinished dependent set 230. This permits the user to find the order of tasks to be run in the task queue 210. The user can also determine the tasks that are delayed by examining the waiting set 220. Additionally, by selecting a particular waiting task in the waiting set 220, the user can determine the dependent tasks that are not completed and that are preventing the execution of the waiting task. Additionally, the user can select one of the dependent tasks in the unfinished dependent set 230, and find out which waiting tasks are associated with the selected dependent task.

The task scheduler 420 also improves processor performance, especially in a multiprocessor system, because when the task scheduler 420 sends a task to a processor for execution, the task scheduler 420 has determined that that task can execute, and the processor 410 does not have to then execute a process that would not successfully complete (e.g., because of an unfinished dependent task). Additionally, with the ordered task queue 210 and the waiting set 220, the task scheduler 420 easily knows which waiting tasks can be run immediately. And if a task returns a fail to complete, the task scheduler easily removes all waiting tasks from the waiting set 220 that are dependent on the failed task.

Figure 8:
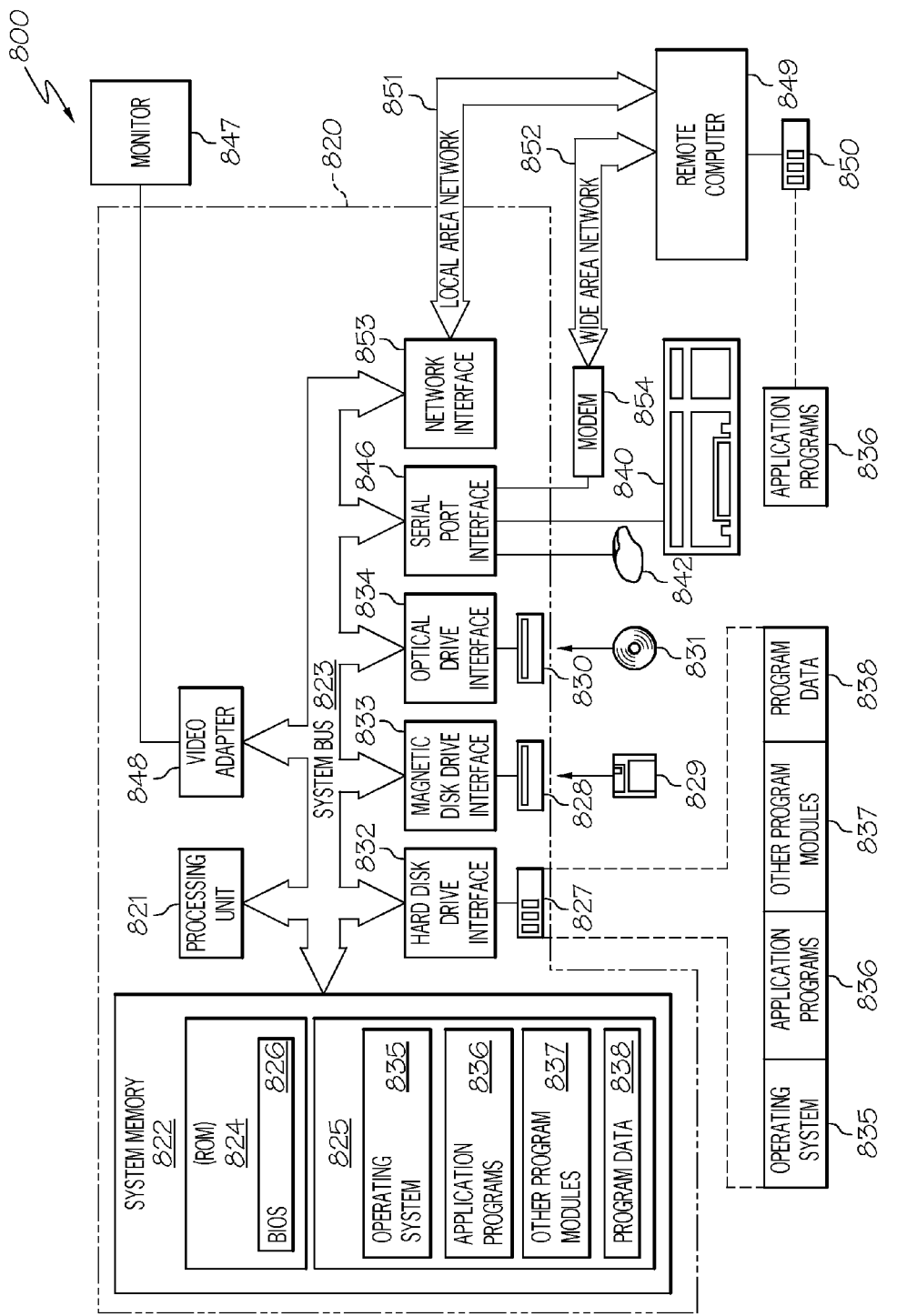
FIG. 8 is a block diagram illustrating an example of a computer system upon which one or more of the embodiments of this disclosure can execute.

FIG. 8 is an overview diagram of hardware and an operating environment in conjunction with which embodiments may be practiced. The description of FIG. 8 is intended to provide a brief, general description of suitable computer hardware and a suitable computing environment in conjunction with which the embodiments may be implemented. Some embodiments are described in the general context of computer-executable instructions, such as program modules, being executed by a computer, such as a personal computer.

Generally, program modules include routines, programs, objects, components, data structures, etc., that perform particular tasks or implement particular abstract data types.

Moreover, those skilled in the art will appreciate that the embodiments may be practiced with other computer system configurations, including hand-held devices, multiprocessor systems, microprocessor-based or programmable consumer electronics, network PCS, minicomputers, mainframe computers, and the like. Embodiments may also be practiced in distributed computer environments where tasks are performed by I/O remote processing devices that are linked through a communications network. In a distributed computing environment, program modules may be located in both local and remote memory storage devices.

In the embodiment shown in FIG. 8, a hardware and operating environment is provided that is applicable to any of the servers and/or remote clients shown in the other Figures.

As shown in FIG. 8, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for one or more embodiments can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the disclosed embodiments are not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 8 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Thus, an example system, method and machine readable medium for implementing multi-tenancy governance within a cloud computing environment have been described. Although specific example embodiments have been described, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
a computer processor;
a computer readable storage medium having computer readable program code, the computer readable program code executable by the computer processor to cause the system to:
select for execution a first task from a queue of tasks based, at least in part, on a first scheduled execution time of the first task, wherein the tasks are ordered in the queue according to scheduled execution times, wherein the first task is periodically scheduled for execution;
determine whether the first task has one or more dependent tasks associated with the first task;
in response to a determination that the first task has a dependent task, determine whether the dependent task has completed execution;
in response to a determination that all dependent tasks associated with the first task have completed execution, execute the first task;
in response to a determination that all dependent tasks associated with the first task have not completed execution, place the first task in a set of waiting tasks;
after placement of the first task in the set of waiting tasks, place a first dependent task that has not completed execution and is not already in a set of unfinished dependent tasks in the set of unfinished dependent tasks, and
establish a link between the first task and the first dependent task in the set of unfinished dependent tasks; and
in response to a determination that the first task has been in the set of waiting tasks for an amount of time, determine that the first task is part of an improper loop dependency based, at least in part, on a subset of tasks being in the set of waiting tasks and the subset of tasks also being in the set of unfinished dependent tasks, wherein the subset of tasks includes the first task, and
in response to a determination that the first task is part of the improper loop dependency, remove the subset of tasks from the set of waiting tasks and from the set of unfinished dependent tasks.

2. The system of claim 1 further comprising program code executable by the computer processor to cause the system to:
in response to execution of the first task after all dependent tasks associated with the first task have completed execution, determine whether the first task is in the set of unfinished dependent tasks; and
in response to a determination that the first task is in the set of unfinished dependent tasks,
identify a second task in the set of waiting tasks, wherein the first task is associated with the second task,
determine whether the second task can be executed.

3. The system of claim 1 further comprising program code executable by the computer processor to cause the system to determine a time at which the first task will be executed based, at least in part, on a time at which the first dependent task is scheduled for execution.

4. The system of claim 1 further comprising program code executable by the computer processor to cause the system to, in response to the first task failing to execute, add the first task to the queue of tasks at a next available execution time.

5. The system of claim 1 further comprising program code executable by the computer processor to cause the system to:
in response to the first task failing to execute, determine whether the first task can be executed again;
in response to a determination that the first task cannot be executed again, determine whether the first task is in the set of unfinished dependent tasks; and
in response to a determination that the first task is in the set of unfinished dependent tasks,
identify a second task in the set of waiting tasks, wherein the first task is associated with the second task,
indicate the second task as having failed execution.

6. The system of claim 1 further comprising program code executable by the computer processor to cause the system to:
in response to a determination that the first task is part of the improper loop dependency, identify a second task that is part of the improper loop dependency, and indicate that the first task and the second task cannot be executed.

7. The system of claim 1 further comprising program code executable by the computer processor to cause the system to:
in response to execution of the first task after all dependent tasks associated with the first task have completed execution,
schedule the first task for execution at a second scheduled execution time based, at least in part, on a time the first task was previously executed and a time the first dependent task was previously executed, and
add the first task to the queue of tasks according to the second scheduled execution time.

8. A method comprising:
selecting for execution a first task from a queue of tasks based, at least in part, on a first scheduled execution time of the first task, wherein the tasks are ordered in the queue according to scheduled execution times, wherein the first task is periodically scheduled for execution;

determining whether the first task has one or more dependent tasks associated with the first task;
in response to determining that the first task has a dependent task, determining whether the dependent task has completed execution;
in response to determining that all dependent tasks associated with the first task have completed execution, executing the first task;
in response to determining that all dependent tasks associated with the first task have not completed execution, place the first task in a set of waiting tasks;
after placing the first task in the set of waiting tasks,
  placing a first dependent task that has not completed execution and is not already in a set of unfinished dependent tasks in the set of unfinished dependent tasks, and
  establishing a link between the first task and the first dependent task in the set of unfinished dependent tasks; and
in response to a determination that the first task has been in the set of waiting tasks for an amount of time,
  determining that the first task is part of an improper loop dependency based, at least in part, on a subset of tasks being in the set of waiting tasks and the subset of tasks also being in the set of unfinished dependent tasks, wherein the subset of tasks includes the first task, and
  in response to a determination that the first task is part of the improper loop dependency, removing the subset of tasks from the set of waiting tasks and from the set of unfinished dependent tasks.

9. The method of claim 8 further comprising:
in response to execution of the first task after all dependent tasks associated with the first task have completed execution, determining whether the first task is in the set of unfinished dependent tasks; and
in response to determining that the first task is in the set of unfinished dependent tasks,
  identifying a second task in the set of waiting tasks, wherein the first task is associated with the second task,
  determining whether the second task can be executed.

10. The method of claim 8 further comprising determining a time at which the first task will be executed based, at least in part, on a time at which the first dependent task is scheduled for execution.

11. The method of claim 8 further comprising, in response to the first task failing to execute, adding the first task to the queue of tasks at a next available execution time.

12. The method of claim 8 further comprising:
in response to execution of the first task after all dependent tasks associated with the first task have completed execution,
  scheduling the first task for execution at a second scheduled execution time for the first task based, at least in part, on a time the first task was previously executed and a time the first dependent task was previously executed,
  adding the first task to the queue of tasks according to the second scheduled execution time.

13. The method of claim 8 further comprising:
in response to the first task failing to execute, determining whether the first task can be executed again;
in response to a determination that the first task cannot be executed again, determining whether the first task is in the set of unfinished dependent tasks; and
in response to a determination that the first task is in the set of unfinished dependent tasks,
  identifying a second task in the set of waiting tasks, wherein the first task is associated with the second task,
  indicating the second task as having failed execution.

14. The method of claim 8 further comprising:
in response to a determination that the first task is part of the improper loop dependency, identifying a second task that is part of the improper loop dependency, and indicating that the first task and the second task cannot be executed.

15. A non-transitory computer readable medium having computer readable program code stored therein, the program code to:
select for execution a first task from a queue of tasks based, at least in part, on a first scheduled execution time of the first task, wherein the tasks are ordered in the queue according to scheduled execution times, wherein the first task is periodically scheduled for execution;
determine whether the first task has one or more dependent tasks associated with the first task;
in response to a determination that the first task has a dependent task, determine whether the dependent task has completed execution;
in response to a determination that all dependent tasks associated with the first task have completed execution, execute the first task;
in response to a determination that all dependent tasks associated with the first task have not completed execution, place the first task in a set of waiting tasks;
after placement of the first task in the set of waiting tasks,
  place a first dependent task that has not completed execution and is not already in a set of unfinished dependent tasks in the set of unfinished dependent tasks, and
  establish a link between the first task and the first dependent task in the set of unfinished dependent tasks; and
in response to a determination that the first task has been in the set of waiting tasks for an amount of time,
  determine that the first task is part of an improper loop dependency based, at least in part, on a subset of tasks being in the set of waiting tasks and the subset of tasks also being in the set of unfinished dependent tasks, wherein the subset of tasks includes the first task; and
  in response to a determination that the first task is part of the improper loop dependency, remove the subset of tasks from the set of waiting tasks and from the set of unfinished dependent tasks.

16. The computer readable medium of claim 15 further comprising program code to:
in response to the first task failing to execute, determine whether the first task can be executed again;
in response to a determination that the first task cannot be executed again, determine whether the first task is in the set of unfinished dependent tasks; and
in response to a determination that the first task is in the set of unfinished dependent tasks,
  identify a second task in the set of waiting tasks, wherein the first task is associated with the second task,
  indicate the second task as having failed execution.

17. The computer readable medium of claim 15 further comprising program code to:
in response to a determination that the first task is part of the improper loop dependency, identify a second task that is part of the improper loop dependency, and indicate that the first task and the second task cannot be executed.

18. The computer readable medium of claim 15 further comprising program code to:
- in response to execution of the first task after all dependent tasks associated with the first task have completed execution, determine whether the first task is in the set of unfinished dependent tasks; and
- in response to a determination that the first task is in the set of unfinished dependent tasks,
  - identify a second task in the set of waiting tasks, wherein the first task is associated with the second task,
  - determine whether the second task can be executed.

19. The computer readable medium of claim 15 further comprising program code to:
- in response to execution of the first task after all dependent tasks associated with the first task have completed execution,
  - schedule the first task for execution at a second scheduled execution time based, at least in part, on a time the first task was previously executed and a time the first dependent task was previously executed,
- add the first task to the queue of tasks according to the second scheduled execution time.

* * * * *